Figure 3:
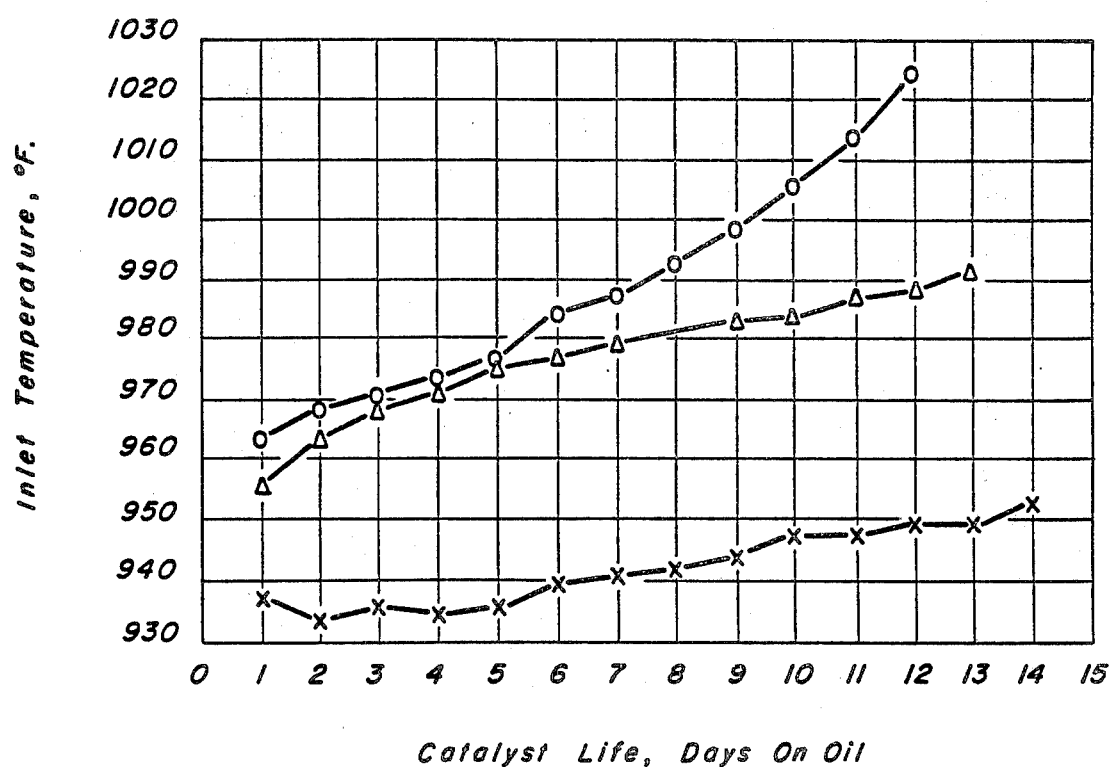

United States Patent [19]

Antos et al.

[11] 4,416,804

[45] Nov. 22, 1983

[54] ACIDIC MULTIMETALLIC CATALYTIC COMPOSITE

[75] Inventors: George J. Antos, Bartlett; Tai-Hsiang Chao, Des Plaines, both of Ill.

[73] Assignee: UOP Inc., Des Plaines, Ill.

[21] Appl. No.: 385,589

[22] Filed: Jun. 7, 1982

Related U.S. Application Data

[60] Division of Ser. No. 324,302, Nov. 23, 1981, Pat. No. 4,367,137, which is a continuation of Ser. No. 212,780, Dec. 4, 1980, abandoned.

[51] Int. Cl.$^3$ .............................................. B01J 27/14
[52] U.S. Cl. ...................................... 502/213; 252/435
[58] Field of Search ................................ 252/435, 437

[56] References Cited

U.S. PATENT DOCUMENTS

| | | | |
|---|---|---|---|
| 2,441,297 | 5/1948 | Stirton | 585/420 X |
| 2,620,314 | 12/1952 | Hoekstra | 252/448 X |
| 2,890,167 | 6/1959 | Haensel | 208/139 |
| 2,892,858 | 6/1959 | Ziegler | 568/820 X |
| 2,999,074 | 9/1961 | Bloch et al. | 252/441 X |
| 3,224,831 | 12/1965 | Stephens | 23/2 |
| 3,227,658 | 1/1966 | Myers et al. | 252/433 |
| 3,642,658 | 12/1968 | Ollum et al. | 252/431 P |
| 3,661,805 | 5/1972 | Howoth | 252/458 X |
| 3,781,223 | 12/1973 | Walker et al. | 252/437 |
| 3,852,190 | 12/1974 | Buss et al. | 208/138 |
| 4,012,313 | 5/1977 | Buss et al. | 252/441 X |
| 4,032,475 | 6/1977 | Knapils et al. | 208/139 X |
| 4,046,672 | 9/1977 | Pollitzer et al. | 208/139 |
| 4,087,353 | 5/1978 | Rausch | 252/435 X |
| 4,122,039 | 10/1978 | Kobylinski et al. | 252/435 |

Primary Examiner—William G. Wright
Attorney, Agent, or Firm—James R. Hoatson, Jr.; Kenneth J. Pedersen; William H. Page, II

[57] ABSTRACT

Hydrocarbons are converted by contacting them at hydrocarbon conversion conditions with an acidic multimetallic catalytic composite comprising a combination of catalytically effective amounts of a platinum group component, a cobalt component, a tin component, a phosphorus component and a halogen component with a porous carrier material. The platinum group, cobalt, tin, phosphorus and halogen components are present in the multimetallic catalyst in amounts respectively, calculated on an elemental basis, corresponding to about 0.01 to about 2 wt. % platinum group metal, about 0.05 to about 5 wt. % cobalt, about 0.01 to about 5 Wt. % tin, about 0.01 to about 5 wt. % phosphorus and about 0.1 to about 3.5 wt. % halogen. A specific example of the type of hydrocarbon conversion process disclosed is a process for the catalytic reforming of a low-octane gasoline fraction wherein the gasoline fraction and a hydrogen stream are contacted with the acidic multimetallic catalyst disclosed herein at reforming conditions.

17 Claims, 6 Drawing Figures

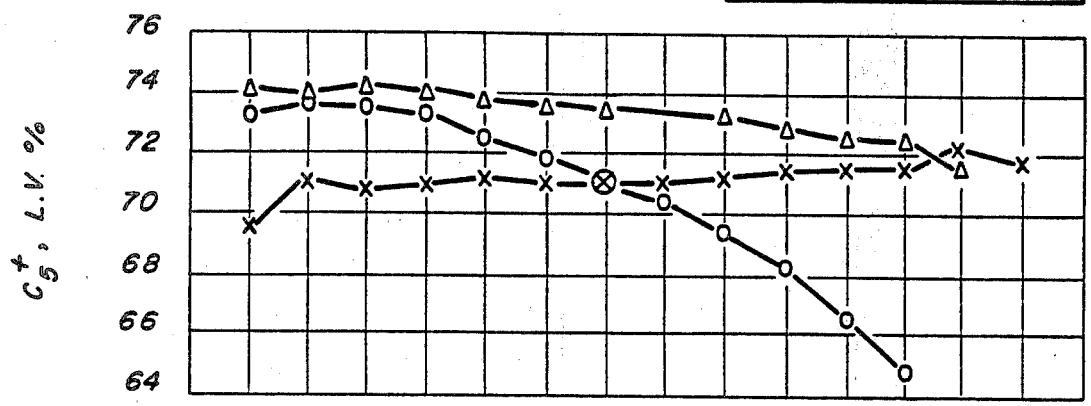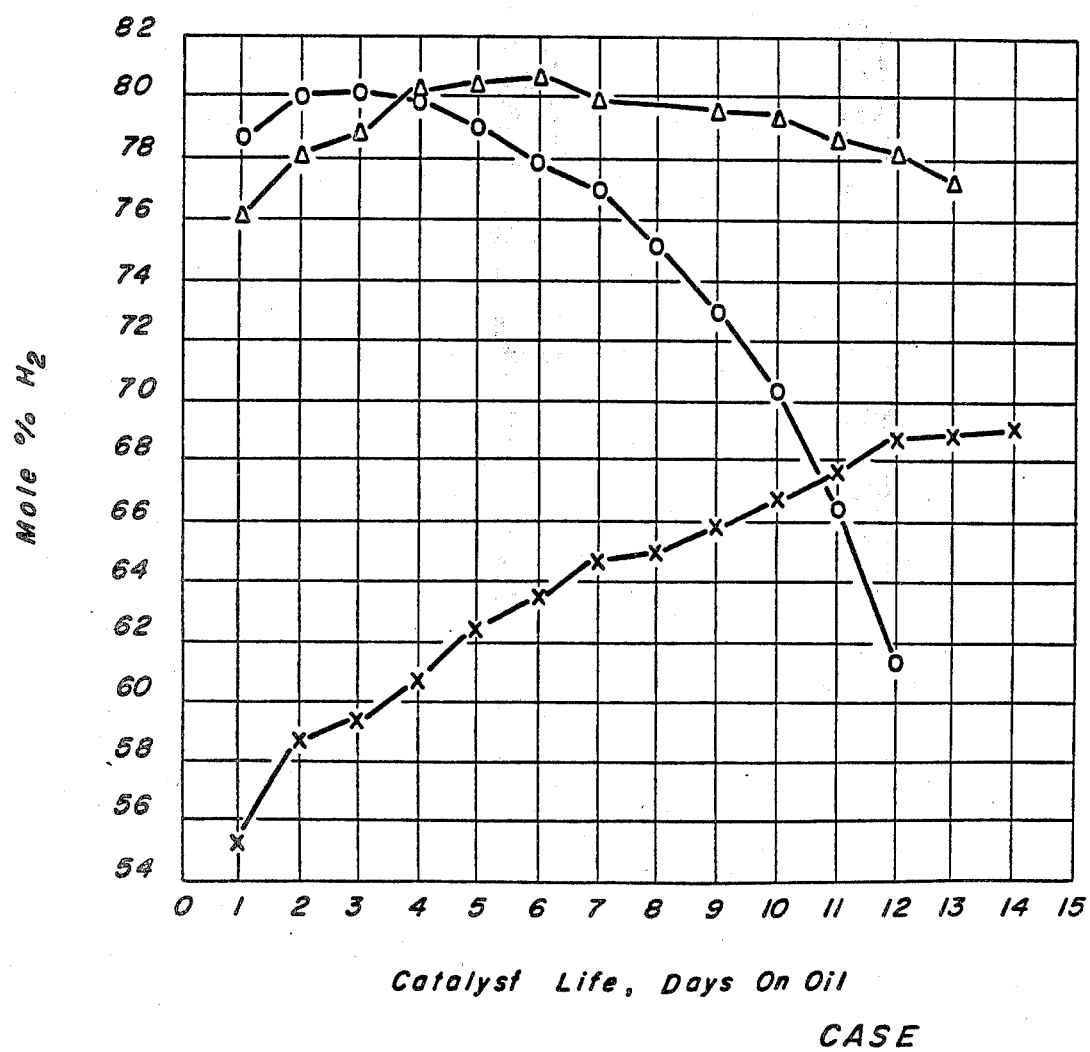

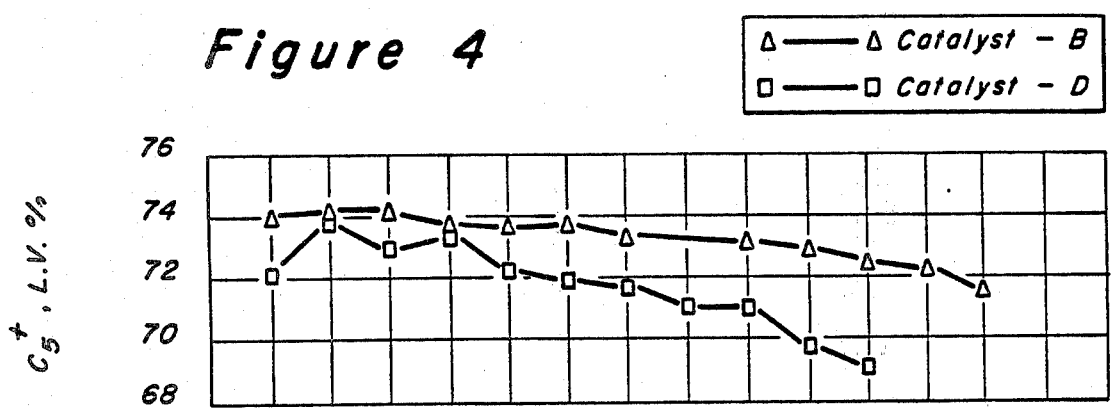
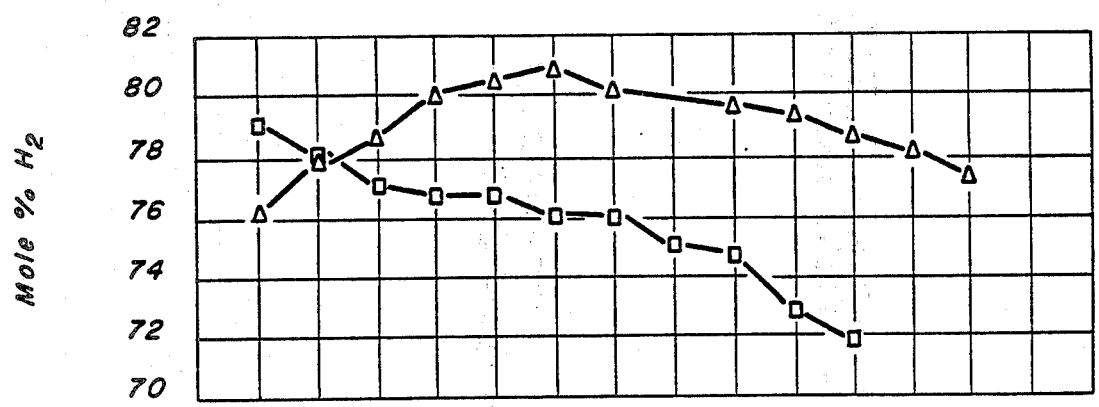
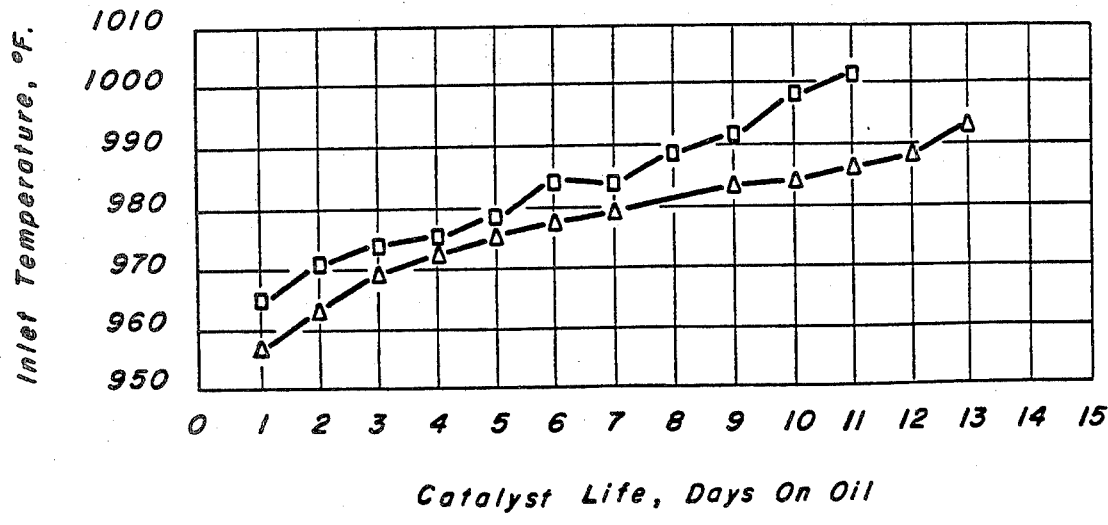

ACIDIC MULTIMETALLIC CATALYTIC COMPOSITE

This application is a division of application Ser. No. 324,302 filed Nov. 23, 1981 and issued on Jan. 4, 1983 as U.S. Pat. No. 4,367,137, which is a continuation of application Ser. No. 212,780 filed Dec. 4, 1980, previously allowed but now abandoned.

The subject of the present invention is a novel acidic multimetallic catalytic composite which has exceptional selectivity and resistance to deactivation when employed in a hydrocarbon conversion process that requires a catalyst having both a hydrogenation-dehydrogenation function and a carbonium ion-forming function. More precisely, the present invention involves a novel dual-function acidic multimetallic catalytic composite which, quite surprisingly, enables substantial improvements in hydrocarbon conversion processes that have traditionally used a dual-function catalyst. In another aspect, the present invention comprehends the improved processes that are produced by the use of a catalytic composite comprising a combination of catalytically effective amounts of a platinum group component, a cobalt component, a tin component, a phosphorus component and a halogen component with a porous carrier material; specifically, an improved reforming process which utilizes the subject catalyst to improve activity, selectivity and stability characteristics.

Composites having a hydrogenation-dehydrogenation function and a carbonium ion-forming function are widely used today as catalysts in many industries, such as the petroleum and petrochemical industry, to accelerate a wide spectrum of hydrocarbon conversion reactions. Generally, the carbonium ion-forming function is thought to be associated with an acid-acting material of the porous, adsorptive, refractory oxide type which is typically utilized as the support or carrier for a heavy metal component such as the metals or compounds of metals of Groups V through VIII of the Periodic Table to which are generally attributed the hydrogenation-dehydrogenation function.

These catalytic composites are used to accelerate a wide variety of hydrocarbon conversion reactions such as hydrocracking, hydrogenolysis, isomerization, dehydrogenation, hydrogenation, desulfurization, cyclization, polymerization, alkylation, cracking, hydroisomerization, dealkylation, transalkylation, etc. In many cases, the commercial applications of these catalysts are in processes where more than one of the reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking and hydrogenolysis of naphthenes and paraffins, and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is a hydroisomerization process wherein a hydrocarbon fraction which is relatively rich in straight-chain paraffin compounds is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as hydrogen; (2) selectivity refers to the amount of desired product or products obtained relative to the amount of reactants charged or converted; (3) stability refers to the rate of change with time of the activity and selectivity parameters—obviously, the smaller rate implying the more stable catalyst. In a reforming process, for example, activity commonly refers to the amount of conversion that takes place for a given charge stock at a specified severity level and is typically measured by octane number of the C-5 plus product stream; selectivity refers to the amount of C-5 plus yield, relative to the amount of the charge that is obtained at the particular activity or severity level; and stability is typically equated to the rate of change with time of activty, as measured by octane number of C-5 plus product, and of selectivity as measured by C-5 plus yield. Actually, the last statement is not strictly correct because generally a continuous reforming process is run to produce a constant octane C-5 plus product with severity level being continuously adjusted to attain this result; and furthermore, the severity level is for this process usually varied by adjusting the conversion temperature in the reaction so that, in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which is a hydrogen-deficient polymeric substance having properties akin to both polynuclear aromatics and graphite. This material coats the surface of the catalyst and thus reduces its activity by shielding its active sites from the reactants. In other words, the performance of this dual-function catalyst is sensitive to the presence of carbonaceous deposits or coke on the surface of the catalyst. Accordingly, the major problem facing workers in this area of the art is the development of more active and/or selective catalytic composites that are not as sensitive to the presence of these carbonaceous materials and/or have the capability to suppress the rate of the formation of these carbonaceous materials on the catalyst. Viewed in terms of performance parameters, the problem is to develop a dual-function catalyst having superior activity, selectivity, and stability characteristics. In particular, for a reforming process, the problem is typically expressed in terms of shifting and stabilizing the C-5 plus yield-octane relationship at the lowest possible severity level—C-5 plus yield being representative of selectivity and octane being proportional to activity.

We have now found a dual-function acidic multimetallic catalytic composite which possesses improved activity, selectivity, and stability characteristics when it is employed in a process for the conversion of hydrocarbons of the type which have heretofore utilized dual-function acidic catalytic composites such as processes for isomerization, hydroisomerization, dehydrogenation, desulfurization, denitrogenization, hydrogenation, alkylation, dealkylation, disproportionation, polymerization, hydro-dealkylation, transalkylation, cyclization, dehydrocyclization, cracking, hydrocracking, halogenation, reforming, and the like processes. In particular, we have ascertained that an acidic catalyst, comprising a combination of catalytically effective amounts of a platinum group component, a cobalt component, a tin component, a phosphorus component and a halogen component with a porous refractory carrier material, can enable the performance of hydrocarbon conversion processes utilizing dual-function catalysts to be substantially improved. Moreover, we have determined that an acidic catalytic composite, comprising a combination of catalytically effective amounts of a platinum group component, a cobalt component, a tin component, a phosphorus component and a chloride component with an alumina carrier material, can be utilized to substantially improve the performance of a reforming process which operates on a low-octane gasoline fraction to produce a high-octane reformate. In the case of a reforming process, the principal advantages associated with the use of the present invention involve: (1) the acquisition of the capability to operate in a stable manner in a high severity operation; for example, a low or moderate pressure reforming process designed to produce a C-5 plus reformate having an octane of about 100 F-1 clear; (2) significantly increased selectivity for C-5 plus yield and hydrogen production accompanied by increased tolerance for sulfur contaminants relative to the performance of the prior art platinum-cobalt-tin catalyst system; (3) and, improved selectivity, activity, selectivity-stability and activity-stability relative to the prior art sulfided platinum-cobalt-tin catalyst system. As indicated, the present invention essentially involves the finding that the addition of a combination of a cobalt component, a tin component and a phosphorus component to a dual-function acidic hydrocarbon conversion catalyst a platinum group component can enable the performance characteristics of the catalyst to be sharply and materially improved.

It is, accordingly, one object of the present invention to provide an acidic multimetallic hydrocarbon conversion catalyst having superior performance characteristics when utilized in a hydrocarbon conversion process. A second object is to provide an acidic multimetallic catalyst having dual-function hydrocarbon conversion performance characteristics that are relatively insensitive to the deposition of hydrocarbonaceous material thereon. A third object is to provide preferred methods of preparation of this acidic multimetallic catalytic composite which ensures the achievement and maintenance of its properties. Another object is to provide an improved reforming catalyst having superior activity, selectivity, and stability characteristics. Yet another object is to provide a dual-function hydrocarbon conversion catalyst which utilizes a combination of a cobalt component, a tin component and a phosphorus component to beneficially interact with and promote an acidic catalyst containing a platinum group component.

In brief summary, the present invention is, in one embodiment, an acidic catalytic composite comprising a porous carrier material containing, on an elemental basis, about 0.01 to about 2 wt. % platinum group metal, about 0.05 to about 5 wt. % cobalt, about 0.01 to about 5 wt. % tin, about 0.01 to about 5 wt. % phosphorus, and about 0.1 to about 3.5 wt. % halogen.

A second embodiment relates to an acidic catalytic composite comprising a porous carrier material containing, on an elemental basis, about 0.05 to about 1 wt. % platinum group metal, about 0.1 to about 2.5 wt. % cobalt, about 0.05 to about 2 wt. % tin, about 0.05 to about 3 wt. % phosphorus and about 0.5 to about 1.5 wt. % halogen.

A third embodiment relates to the catalytic composite described in the first or second embodiment wherein the halogen is combined chloride.

Yet another embodiment involves a process for the conversion of a hydrocarbon comprising contacting the hydrocarbon and hydrogen with the catalytic composite described above in the first or second or third embodiment at hydrocarbon conversion conditions.

A preferred embodiment comprehends a process for reforming a gasoline fraction which comprises contacting the gasoline fraction and hydrogen with the catalytic composite described above in the first or second or third embodiment at reforming conditions selected to produce a high octane reformate.

A highly preferred embodiment is a process for reforming a gasoline fraction which comprises contacting the gasoline fraction and hydrogen in a substantially water-free environment with the catalytic composite characterized in the first, second, or third embodiment at reforming conditions selected to produce a high octane reformate.

Other objects and embodiments of the present invention relate to additional details regarding preferred catalytic ingredients, preferred amounts of ingredients, suitable methods of composite preparation, operating conditions for use in the hydrocarbon conversion processes, and the like particulars, which are hereinafter given in the following detailed discussion of each of these facets of the present invention.

The acidic multimetallic catalyst of the present invention comprises a porous carrier material or support having combined therewith catalytically effective amounts of a platinum group component, a cobalt component, a tin component, a phosphorus component and a halogen component.

Considering first the porous carrier material utilized in the present invention, it is preferred that the material be a porous, adsorptive, high-surface area support having a surface area of about 25 to about 500 sq.m./g. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, silicon carbide, clays, and silicates including those synthetically prepared and naturally occurring, which may or may not be acid treated, for example, attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, beryllium oxide, vanadium oxide, cesium oxide, hafnium oxide, zinc oxide, magnesia, boria, thoria, silica-alumina, silica-magnesia, chromia-alumina, alumina-boria, silica-zirconia, etc.; (5) crystalline zeolitic aluminosilicates such as naturally occurring or synthetically prepared mordenite and/or faujasite, either in the hydrogen form or in a form which has been treated with multivalent cations; (6) spinels such as $MgAl_2O_4$, $FeAl_2O_4$, $ZnAl_2O_4$, $MnAl_2O_4$, $CaAl_2O_4$, and other like compounds having the formula $MO.AL_2O_3$ where M is a metal having a valence of 2; and (7) combinations of elements from one or more of these groups. The preferred porous carrier materials for use in the present invention are refractory inorganic oxides, with best results obtained with an alumina carrier material. Suitable alumina materials are the crystalline aluminas known as gamma-, eta-, and theta-alumina, with gamma- or eta-alumina giving best results. In addition, in some embodiments, the alumina carrier material may contain minor proportions of other well known refractory inorganic oxides such as silica, zirconia, magnesia, etc.; however, the preferred support is substantially pure gamma- or eta-alumina. Preferred carrier materials have an apparent bulk density of about 0.3 to about 0.9 g/cc and surface area characteristics such that the average pore diameter is about 20 to about 300 Angstroms, the pore volume (B.E.T.) is about 0.1 to about 1 cc/g and the surface area (B.E.T.) is about 100 to about 500 sq.m./g. In general, best results are typically obtained with a gamma-alumina carrier material which is used in the form of spherical particles having: a relatively small diameter (i.e. typically about 1/16-inch), an apparent bulk density of about 0.3 to about 0.8 g/cc, a pore volume (B.E.T.) of about 0.2 to about 0.8 ml/g, and a surface area (B.E.T.) of about 150 to about 250 sq.m./g.

The preferred alumina carrier material may be prepared in any suitable manner and may be synthetically prepared or naturally occurring. Whatever type of alumina is employed, it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide, to a salt of aluminum such as aluminum chloride, aluminum nitrate, etc., in an amount to form an aluminum hydrooxide gel which upon drying and calcining is converted to alumina. The alumina carrier may be formed in any desired shape such as spheres, pills, cakes, extrudates, powders, granules, tablets, etc., and utilized in any desired size. For the purpose of the present invention, a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the resultant hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

Another particularly preferred alumina carrier material is synthesized from a unique crystalline alumina powder which has been characterized in U.S. Pat. Nos. 3,852,190 and 4,012,313 as a byproduct from a Ziegler higher alcohol synthesis reaction as described in Ziegler's U.S. Pat. No. 2,892,858. For purposes of simplification, the name "Ziegler alumina" is used herein to identify this material. It is presently available from the Conoco Chemical Division of Continental Oil Company under the trademark Catapal. This material is an extremely high purity alpha-alumina monohydrate (boehmite) which after calcination at a high temperature has been shown to yield a high purity gamma-alumina. It is commercially available in three forms: (1) Catapal SB—a spray dried powder having a typical surface area of 250 $m^2/g$; (2) Catapal NG—a rotary kiln dried alumina having a typical surface area of 180 $m^2/g$; and (3) Dispal M—a finely divided dispersable product having a typical surface area of about 185 $m^2/g$. For purposes of the present invention, the preferred starting material is the spray dried powder, Catapal SB. This alpha-alumina monohydrate powder may be formed into a suitable catalyst material according to any of the techniques known to those skilled in the catalyst carrier material forming art. Spherical carrier material particles can be formed, for example, from this Ziegler alumina by: (1) converting the alpha-alumina monohydrate powder into an alumina sol by reaction with a suitable peptizing acid and water and thereafter dropping a mixture of the resulting sol and a gelling agent into an oil bath to form spherical particles of an alumina gel which are easily converted to a gamma-alumina carrier material by known methods; (2) forming an extrudate from the powder by established methods and thereafter rolling the extrudate particles on a spinning disc until spherical particles are formed which can then be dried and calcined to form the desired particles of spherical carrier material; and (3) wetting the powder with a suitable peptizing agent and thereafter rolling particles of the powder into spherical masses of the desired size in much the same way that children have been known to make parts of snowmen by rolling snowballs down hills covered with wet snow. This alumina powder can also be formed in any other desired shape or type of carrier material known to those skilled in the art such as rods, pills, pellets, tablets, granules, extrudates and the like forms by methods well known to the practitioners of the catalyst carrier material forming art. The preferred type of carrier material for the present invention is a cylindrical extrudate having a diameter of about 1/32" to about ⅛" (especially about 1/16") and a length to diameter (L/D) ratio of about 1:1 to about 5:1, with a L/D ratio of about 2:1 being especially preferred. The especially preferred extrudate form of the carrier material is preferably prepared by mixing the alumina powder with water and a suitable peptizing agent such as nitric acid, acetic acid, aluminum nitrate, ammonium hydroxide and the like material until an extrudable dough is formed. The amount of water added to form the dough is typically sufficient to give a loss on ignition (LOI) at 500° C. of about 45 to 65 wt. %, with a value of about 55 wt. % being especially preferred. On the other hand, the peptizing agent addition rate is generally sufficient to provide about 2 to 7 wt. % of the volatile free alumina powder used in the mix, with a value of about 3 to 4% being especially preferred. The resulting dough is then extruded through a suitably sized die to form extrudate particles. It is to be noted that it is within the scope of the present invention to treat the resulting dough with an aqueous solution of ammonium hydroxide in accordance with the teachings of U.S. Pat. No. 3,661,805. This treatment may be performed either before or after extrusion, with the former being preferred. These particles are then dried at a temperature of about 500° to 800° F. for a period of about 0.1 to about 5 hours and thereafter calcined at a temperature of about 900° F. to about 1500° F. for a period of about 0.5 to about 5 hours to form the preferred extrudate particles of the Ziegler alumina carrier material. In addition, in some embodiments of the present invention the Ziegler alumina carrier material may contain minor proportions of other well known refractory inorganic oxides such as silica, titanium dioxide, zirconium dioxide, chromium oxide, beryllium oxide, vanadium oxide, cesium oxide, hafnium oxide, zinc oxide, iron oxide, cobalt oxide, magnesia, boria, thoria, and the like materials which can be blended into the extrudable dough prior to the extrusion of same. In the same manner crystalline zeolitic aluminosilicates such as naturally occurring or synthetically prepared mordenite and/or faujasite, either in the hydrogen form or in a form which has been treated with a multivalent cation, such as a rare earth, can be incorporated into this carrier material by blending finely divided particles of same into the extrudable dough prior to extrusion of same. A preferred carrier material of this type is substantially pure Ziegler alumina having an apparaent bulk density (ABD) of about 0.5 to 1 g/cc (especially an ABD of about 0.6 to about 0.85 g/cc), a surface area of about 150 to about 280 $m^2/g$ (preferably about 185 to about 235 $m^2/g$), and a pore volume of about 0.3 to about 0.8 cc/g.

A first essential ingredient of the subject catalyst is the platinum group component. That is, it is intended to cover the use of platinum, iridium, osmium, ruthenium, rhodium, palladium or mixtures thereof as a first component of the present composite. Although it is not intended to restrict the present invention by this explanation, it is believed that best results are obtained when substantially all of the platinum group component exists within the final catalytic composite in the elemental metallic state. However, as hereinafter described, the phosphorus component of the present catalytic composite may be associated either physically and/or chemically with this platinum group component. Generally, the amount of this component present in the final catalytic composite is small and typically will comprise about 0.01 to about 2 wt. % of the final catalytic component, calculated on an elemental basis. Excellent results are obtained when the catalyst contains about 0.05 to about 0.05 to about 1 wt. % of platinum, iridium, rhodium, or palladium metal. Particularly preferred mixtures of these metals are platinum and iridium, and platinum and rhodium.

This platinum group component may be incorporated in the catalytic composite in any suitable manner known to result in a relatively uniform distribution of this component in the carrier material such as coprecipitation or cogelation, ion exchange or impregnation. The preferred method of preparing the catalyst involves the utilization of a soluble, decomposable compound of platinum group metal to impregnate the carrier material in a relatively uniform manner. For example, this component may be added to the support by commingling the latter with an aqueous solution of chloroplatinic or chloroiridic or chloropalladic acid. Other water-soluble compounds or complexes of platinum group metals may be employed in impregnation solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, palladium nitrate, palladium sulfate, diamminepalladium (II) hydroxide, tetramminepalladium (II) chloride, hexamminerhodium chloride, rhodium carbonylchloride, rhodium trichloride hydrate, rhodium nitrate, sodium hexachlororhodate (II), sodium hexanitrorhodate (II), iridium tribromide, iridium dichloride, iridium tetrachloride, sodium hexanitroiridate (III), potassium or sodium chloroiridate, potassium rhodium oxalate, etc. The utilization of a platinum, iridium, rhodium, or palladium chloride compound, such as chloroplatinic, chloroiridic, or chloropalladic acid or rhodium trichloride hydrate, is preferred since it facilitates the incorporation of both the platinum group components and at least a minor quantity of the halogen component in a single step. Hydrogen chloride or the like acid is also generally added to the impregnation solution in order to further facilitate the incorporation of the halogen component and the uniform distribution of the metallic components throughout the carrier material. In addition, it is generally preferred to impregnate the carrier material after it has been calcined in order to minimize the risk of washing away the valuable platinum or palladium compounds; however, in some cases it may be advantageous to impregnate the carrier material when it is in a gelled state.

A second essential constituent of the multimetallic catalyst of the present invention is a tin component. This component may in general be present in the instant catalytic composite in any catalytically available form such as the elemental metal, a compound like the oxide, hydroxide, halide, oxyhalide, aluminate, or in chemical combination with one or more of the other ingredients of the catalyst. Although it is not intended to restrict the present invention by this explanation, it is believed that best results are obtained when the tin compound is present in the composite in a form wherein substantially all of the tin moiety is in an oxidation state above that of the elemental metal such as in the form of tin oxide or tin halide or tin oxyhalide or a mixture thereof and the subsequently described oxidation and reduction steps that are preferably used in the preparation of the instant catalytic composite are specifically designed to achieve this end. The term "tin-oxyhalide" as used herein refers to a coordinated complex of tin, oxygen and halogen which are not necessarily present in the same relationship for all cases covered herein. This tin component can be used in any amount which is catalytically effective, with good results obtained, on an elemental basis, with about 0.01 to about 5 wt. % tin in the catalyst. Best results are ordinarily achieved with about 0.05 to about 2 wt. % tin, calculated on an elemental basis.

This tin component may be incorporated in the catalytic composite in any suitable manner known to the art to result in a relatively uniform dispersion of the tin moiety in the carrier material, such as by coprecipitation or cogellation or coextrusion with the porous carrier material, ion exchange with the gelled carrier material, or impregnation of the porous carrier material either after, before, or during the period when it is dried and calcined. It is to be noted that it is intended to include within the scope of the present invention all conventional methods for incorporating and simultaneously uniformly distributing a metallic component in a catalytic composite and the particular method of incorporation used is not deemed to be an essential feature of the present invention. One particularly preferred method of incorporating the tin component into the catalytic composite involves cogelling or coprecipitating the tin component in the form of the corresponding hydrous oxide during the preparation of the preferred carrier material, alumina. This method typically involves the addition of a suitable sol-soluble or sol-dispersible tin compound such as stannic or stannous chloride, tin acetate, and the like to the alumina hydrosol, thoroughly mixing the resulting tin-containing hydrosol in order to uniformly disperse the tin moiety throughout the sol, and then combining the tin-containing hydrosol with a suitable gelling agent and dropping the resulting mixture into an oil bath, etc., as explained in detail hereinbefore. Alternatively, the tin compound can be added to the gelling agent. After drying and calcining the resulting gelled carrier material in air, there is obtained an intimate combination of alumina and tin oxide and/or oxyhalide. A second preferred method of incorporating the tin component into the catalytic composite involves utilization of a soluble, decomposable compound of tin to impregnate the porous carrier material. In general, the solvent used in this impregnation step is selected on the basis of the capability to dissolve the desired tin compound and to hold it in solution until it is evenly distributed throughout the carrier material without adversely affecting the carrier material or the other ingredients of the catalyst—for example, a suitable alcohol, ether, acid and the like solvents. The solvent is preferably an aqueous, acidic solution. The tin component may thus be added to the carrier material by commingling the latter with an aqueous acidic solution of suitable tin salt, complex, or compound such as stannic acetate, stannous or stannic bromide, stannous or stannic chloride, stannic chloride pentahydrate, stannic chloride diamine, stannic trichloride bromide, stannic chromate, stannous or stannic fluoride, stannic tartrate, dimethyltin dibromide, dimethyltin dichloride, ethylpropyltin dichloride, triethyltin hydroxide, trimethyltin chloride, and the like compounds. A particularly preferred impregnation solution comprises an acidic aqueous solution of stannic or stannous chloride. Suitable acids for use in the impregnation solution are: inorganic acids such as hydrochloric acid, nitric acid, and the like, and strongly acidic organic acids such as oxalic acid, malonic acid, citric acid, and the like. In general, the tin component can be impregnated either prior to, simultaneously with, or after the other components are added to the carrier material. However, excellent results are obtained when the tin component is incorporated into the carrier material during its preparation and the other components are added in subsequent impregnation steps after the tin-containing carrier material is calcined.

A third essential ingredient of the acidic multimetallic catalytic composite of the present invention is a cobalt component. The expression "catalytically available cobalt" as used herein is intended to mean the portion of the cobalt component that is available for use in accelerating the particular hydrocarbon conversion reaction of interest. For certain types of carrier materials which can be used in the preparation of the instant catalyst composite, it has been observed that a portion of the cobalt incorporated therein is essentially bound-up in the crystal structure thereof in a manner which essentially makes it more a part of the refractory carrier material than a catalytically active component. Specific examples of this effect are observed when a refractory cobalt oxide or aluminate is formed by reaction of the carrier material (or precursor thereof) with a portion of the cobalt component and/or when the carrier material can form a spinel or spinel-like structure with a portion of the cobalt component. When this effect occurs, it is only with great difficulty that the portion of the cobalt bound-up with the support can be reduced to a catalytically active state and the conditions required to do this are beyond the severity levels normally associated with hydrocarbon conversion conditions and are in fact likely to seriously damage the necessary porous characteristics of the support. In the cases where cobalt can interact with the crystal structure of the support to render a portion thereof catalytically unavailable, the concept of the present invention merely requires that the amount of cobalt added to the subject catalyst be adjusted to satisfy the requirements of the support as well as the catalytically available cobalt requirements of the present invention. Against this background then, the hereinafter stated specifications for oxidation state and dispersion of the cobalt component are to be interpreted as directed to a description of the catalytically available cobalt. On the other hand, the specifications for the amount of cobalt used are to be interpreted to include all of the cobalt contained in the catalyst in any form.

Although this cobalt component may be initially incorporated into the composite in many different decomposable forms which are hereinafter stated, our basic finding is that best results are obtained when the composite, prior to the subsequently described phosphorus addition step, contains substantially all of the catalytically available cobalt in the elemental metallic state. Examples of the reducible state are obtained when the cobalt component is initially present in the form of cobalt oxide, halide, oxyhalide, and the like reducible compounds. All available evidence indicates that the preferred preparation procedure specifically described in Example I results in the composite having substantially all of the catalytically available cobalt component present in the elemental metallic state prior to the addition of the phosphorus component (as described in Example II). Although the precise chemistry of the cobalt component in the final catalytic composite is unknown, the subsequently discussed examples suggest a very close physical and/or chemical relationship between this component and the subsequently described phosphorus component. The cobalt component may be utilized in the composite in any amount which is catalytically effective, with good results obtained with about 0.05 to about 5 wt. % thereof, calculated on an elemental cobalt basis. Typically, best results are obtained with about 0.1 to about 2.5 wt. % cobalt. It is, additionally, preferred to select the specific amount of cobalt from within this broad weight range as a function of the amount of the platinum group component, on an atomic basis, as is explained hereinafter.

The cobalt component may be incorporated into the catalytic composite in any suitable manner known to those skilled in the catalyst formulation art to result in a relatively uniform distribution of the catalytically available cobalt in the carrier material such as coprecipitation, cogellation, ion exchange, impregnation, etc. In addition, it may be added at any stage of the preparation of the composite—either during preparation of the carrier material or thereafter—since the precise method of incorporation used is not deemed to be critical. However, best results are obtained when the catalytically available cobalt component is relatively uniformly distributed throughout the carrier material in a relatively small particle or cystallite size having a maximum dimension of less than 100 Angstroms, and the preferred procedures are the ones that are known to result in a composite having a relatively uniform distribution of the catalytically available cobalt moiety in a relatively small particle size. One acceptable procedure for incorporating this component into the composite involves cogelling or coprecipitating the cobalt component during the preparation of the preferred carrier material, alumina. This procedure usually comprehends the addition of a soluble, decomposable, and reducible compound of cobalt such as cobalt chloride or nitrate to the alumina hydrosol before it is gelled. The resulting mixture is then finished by conventional gelling, aging, drying, and calcination steps as explained hereinbefore. One preferred way of incorporating this component is an impregnation step wherein the porous carrier material is impregnated with a suitable cobalt-containing solution either before, during, or after the carrier material is calcined or oxidized. The solvent used to form the impregnation solution may be water, alcohol, ether, or any other suitable organic or inorganic solvent provided the solvent does not adversely interact with any of the other ingredients of the composite or interfere with the distribution and reduction of the cobalt component. Preferred impregnation solutions are aqueous solutions of water-soluble, decomposable, and reducible cobalt compounds such as cobaltous acetate, cobaltous benzoate, cobaltous bromate, cobaltous bromide, cobaltous chlorate and perchlorate, cobaltous chloride, cobaltic chloride, cobaltous fluoride, cobaltous iodide, cobaltous nitrate, hexamminecobalt (III) chloride, hexamminecobalt (III) nitrate, triethylenediamminecobalt (III) chloride, cobaltous hexamethylenetetramine, and the like compounds. Best results are ordinarily obtained when the impregnation solution is an aqueous solution of cobalt chloride, acetate or nitrate. This cobalt component can be added to the carrier material, either prior to, simultaneously with, or after the other components are combined therewith. Best results are usually achieved when this component is added simultaneously with the platinum group component via an acidic aqueous impregnation solution. In fact, excellent results are obtained, as reported in the examples, with an impregnation procedure using a tin-containing carrier material and an acidic aqueous solution comprising chloroplatinic acid, cobaltous chloride, and hydrochloric acid.

It is essential to incorporate a halogen component into the acidic multimetallic catalytic composite of the present invention. Although the precise form of the chemistry of the association of the halogen component with the carrier material is not entirely known, it is customary in the art to refer to the halogen component as being combined with the carrier material, or with the other ingredients of the catalyst in the form of the halide (e.g. as the chloride). This combined halogen may be either fluorine, chlorine, iodine, bromine, or mixtures thereof. Of these, fluorine and, particularly, chlorine are preferred for the purposes of the present invention. The halogen may be added to the carrier material in any suitable manner, either during preparation of the support or before or after the addition of the other components. For example, the halogen may be added, at any stage of the preparation of the carrier material or to the calcined carrier material, as an aqueous solution of a suitable, decomposable halogen-containing compound such as hydrogen fluoride, hydrogen chloride, hydrogen bromide, ammonium chloride, etc. The halogen component or a portion thereof, may be combined with the carrier material during the impregnation of the latter with the platinum group, cobalt, or tin components; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For reforming, the halogen will be typically combined with the carrier material in an amount sufficient to result in a final composite that contains about 0.1 to about 3.5 wt. %, and preferably about 0.5 to about 1.5%, by weight of halogen, calculated on an elemental basis. In isomerization or hydrocracking embodiments, it is generally preferred to utilize relatively larger amounts of halogen in the catalyst—typically ranging up to about 10 wt. % halogen calculated on an elemental basis, and more preferably, about 1 to about 5 wt. %. It is to be understood that the specified level of halogen component in the instant catalyst can be achieved or maintained during use in the conversion of hydrocarbons by continuously or periodically adding to the reaction zone a decomposable halogen-containing compound such as an organic chloride (e.g. ethylene dichloride, carbon tetrachloride, t-butyl chloride) in an amount of about 1 to 100 wt. ppm. of the hydrocarbon feed, and preferably about 1 to 10 wt. ppm.

Regarding especially preferred amounts of the various metallic components of the subject catalyst, we have found it to be a good practice to specify the amounts of the cobalt component and the tin component as a function of the amount of the platinum group component. On this basis, the amount of the cobalt component is ordinarily selected so that the atomic ratio of cobalt to platinum group metal contained in the composite is about 0.15:1 to about 66:1, with the preferred range being about 1.6:1 to about 18:1. Similarly, the amount of the tin component is ordinarily selected to produce a composite containing an atomic ratio of tin to platinum group metal of about 0.1:1 to about 13:1, with the preferred range being about 0.3:1 to about 5:1.

Another significant parameter for the instant catalyst is the "total metals content" which is defined to be the sum of the platinum group component, the cobalt component, and the tin component, calculated on an elemental basis. Good results are ordinarily obtained with the subject catalyst when this parameter is fixed at a value of about 0.15 to about 4 wt.%, with best results ordinarily achieved at a metals loading of about 0.3 to about 3 wt. %.

In embodiments of the present invention wherein the instant multimetallic catalytic composite is used for the dehydrogenation of dehydrogenatable hydrocarbons or for the hydrogenation of hydrogenatable hydrocarbons, it is ordinarily a preferred practice to include an alkali or alkaline earth metal component in the composite and to minimize or eliminate the halogen component. More precisely, this optional ingredient is selected from the group consisting of the compounds of the alkali metals—cesium, rubidium, potassium, sodium, and lithium—and the compounds of the alkaline earth metals—calcium, strontium, barium, and magnesium. Generally, good results are obtained in these embodiments when this component constitutes about 0.1 to about 5 wt. % of the composite, calculated on an elemental basis. This optional alkali or alkaline earth metal component can be incorporated in the composite in any of the known ways, with impregnation with an aqueous solution of a suitable water-soluble, decomposable compound being preferred.

An optional ingredient for the acidic multimetallic catalyst of the present invention is a Friedel-Crafts metal halide component. This ingredient is particularly useful in hydrocarbon conversion embodiments of the present invention wherein it is preferred that the catalyst utilized has a strong acid or cracking function associated therewith—for example, an embodiment wherein hydrocarbons are to be hydrocracked or isomerized with the catalyst of the present invention. Suitable metal halides of the Friedel-Crafts type include aluminum chloride, aluminum bromide, ferric chloride, ferric bromide, zinc chloride, and the like compounds, with the aluminum halides and particularly aluminum chloride ordinarily yielding best results. Generally this optional ingredient can be incorporated into the composite of the present invention by any of the conventional methods for adding metallic halides of this type; however, best results are ordinarily obtained when the metallic halide is sublimed onto the surface of the carrier material according to the preferred method disclosed in U.S. Pat. No. 2,999,074. The component can generally be utilized in any amount which is catalytically effective, with a value selected from the range of about 1 to about 100 wt. % of the carrier material generally being preferred.

Regardless of the details of how the metallic components and halogen of the catalyst are combined with the porous carrier material, the catalytic composite at this point in the preparation procedure will generally be dried at a temperature of about 200° to about 600° F. for a period of at least about 2 to about 24 hours or more, and finally calcined or oxidized at a temperature of about 700° F. to about 1100° F., preferably about 800° F. to 950° F. in an air or oxygen atmosphere for a period of about 0.5 to about 10 hours in order to convert substantially all of the metallic components to the corresponding oxide form. Because a halogen component is utilized in the catalyst, best results are generally obtained when the halogen content of the catalyst is adjusted during the oxidation step by including a halogen or a halogen-containing compound such as HCl in the air or oxygen atmosphere utilized. In particular, when the halogen component of the catalyst is chlorine, it is preferred to use a mole ratio of $H_2O$ to HCl of about 5:1 to about 100:1 during at least a portion of the oxidation step in order to adjust the final chlorine content of the catalyst to a range of about 0.1 to about 3.5 wt %. Preferably, the duration of this halogenation step is about 1 to 5 hours.

The resultant oxidized catalytic composite is preferably subjected to a substantially water-free reduction step prior to its use in the conversion of hydrocarbons. This step is designed to selectively reduce at least the platinum group component to the elemental metallic state and to insure a uniform and finely divided dispersion of the metallic components throughout the carrier material, while maintaining the tin component in a positive oxidation state. Preferably, a substantially dry hydrogen stream (i.e. less than 20 vol. ppm. $H_2O$) is used as the reducing agent in this step. The reducing agent is contacted with the oxidized catalyst at conditions including a reduction temperature of about 400° F. to about 1200° F., and preferably about 800° F. to 1000° F., and a period of time of about 0.5 to 10 hours effective to reduce substantially all of the platinum group component to the elemental metallic state, while maintaining the tin component in a oxidation state above that of the elemental metal. We have found that if the hydrogen used in this reduction step contains more than trace amounts of hydrocarbons, the reduction of the catalytically available cobalt component is facilitated. Since we have found that best results are generally obtained when substantially all of the catalytically available cobalt is in the elemental metallic state prior to the addition of the hereinafter described phosphorus component, it is a highly preferred practice to choose the reduction conditions from the ranges previously stated so that this end is achieved.

A key essential ingredient of the catalytic composite of the present invention is a phosphorus component. This component may exist in the catalytic composite of the present invention in any catalytically active form such as the elemental state or as a compound thereof. Despite the fact that the precise form of the chemistry of the association of the phosphorus component with the catalytic composite of the present invention is not known, it is believed to be most intimately related with the cobalt component of the catalytic composite, although it may be associated physically and/or chemically with the carrier material and/or the platinum group and tin components. Although it is not intended to restrict the present invention by this explanation, it is believed that best results are obtained when the phosphorus component exists in the catalytic composite substantially in the form of a phosphide with the cobalt component. This phosphorus component can be used in any amount which is catalytically effective, with good results being obtained, on an elemental basis, with about 0.01 to about 5.0 wt. %. Best results are ordinarily achieved with about 0.05 to about 3.0 wt. %, calculated on an elemental basis.

The phosphorus component may be incorporated in the catalytic composite in any suitable manner known to result in the hereinbefore specified amounts such as direct reaction of elemental phosphorus with the composite at various stages in the preparation thereof, cogellation or coextrusion with the porous carrier material, impregnation, etc.; since the precise form of incorporation of the phosphorus component is not deemed to be critical. Although this component may be added at any stage of the preparation procedure, it is preferred to incorporate the phosphorus component following the incorporation of the metallic components and the hereinbefore described reduction step. One method for incorporating this phosphorus component involves direct reaction of the reduced catalytic composite with elemental phosphorus (white, yellow or red phosphorus) at high temperature. The preferred method for incorporating the phosphorus component involves the utilization of a soluble decomposable compound of phosphorus to impregnate the catalytic composite. The solvent used to form the impregnation solution may be water, a suitable alchohol or ether, or any other suitable organic or inorganic solvent which does not adversely interact with any of the other ingredients of the composite. Suitable phosphorus compounds for use in this impregnation procedure include hypophosphorous acid, dimethylphosphite, triphenylphosphine, cyclohexylphosphine, phosphorus trichloride, phosphoric acid, tributylphosphine oxide, tributyl phosphite, phosphorus tribromide, phosphorus triiodide, phosphorus oxychloride and the like compounds. The preferred impregnation solution comprises an aqueous solution of hypophosphorous acid. In a preferred method of preparing the catalytic composite of the present invention wherein the phosphorus component is added subsequent to the metallic components and the hereinbefore discussed reduction step, the composite will, following impregnation at the phosphorus component, be subjected to a reduction step comprising contacting the composite with a reducing agent, preferably a substantially pure and dry hydrogen stream (i.e. less than 20 vol. ppm. $H_2O$), at a temperature of about 400° F. to about 1200° F., preferably about 800° F. to about 1000° F., for a period of about 0.2 to 5 hours.

According to the present invention, a hydrocarbon charge stock and hydrogen are contacted with the instant acidic multimetallic catalyst in a hydrocarbon conversion zone. This contacting may be accomplished by using the catalyst in a fixed bed system, a moving bed system, a fluidized bed system, or in a batch type operation; however, in view of the danger of attrition losses of the valuable catalyst and of well-known operational advantages, it is preferred to use either a fixed bed system or a dense-phase moving bed system such as is shown in U.S. Pat. No. 3,725,249. In a fixed bed system, a hydrogen-rich gas and the charge stock are preheated by any suitable heating means to the desired reaction temperature and then are passed into a conversion zone containing a fixed bed of the acidic multimetallic catalyst. It is, of course, understood that the conversion zone may be one or more separate reactors with suitable means therebetween to insure that the desired conversion temperature is maintained at the entrance to each reactor. It is also important to note that the reactants may be contacted with the catalyst bed in either upward, downward, or radial flow fashion with the latter being preferred. In addition, the reactants may be in the liquid phase, a mixed liquid-vapor phase, or a vapor phase when they contact the catalyst, with best results obtained in the vapor phase.

In the case where the acidic multimetallic catalyst of the present invention is used in a reforming operation, the reforming system will typically comprise a reforming zone containing one or more fixed beds or dense-phase moving beds of the catalyst. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in some cases aromatics and/or olefins may also be present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha—for example, a naphtha boiling in the range of $C_7$ to 400° F. In some cases, it is also advantageous to charge pure hydrocarbons or mixtures of hydrocarbons that have been extracted from hydrocarbon distillates—for example, straight-chain paraffins—which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous, and water-yielding contaminants therefrom and to saturate any olefins that may be contained therein.

In other hydrocarbon conversion embodiments, the charge stock will be of the conventional type customarily used for the particular kind of hydrocarbon conversion being effected. For example, in a typical isomerization embodiment the charge stock can be a paraffinic stock rich in $C_4$ to $C_8$ normal paraffins, or olefins or a normal butane-rich stock, or a n-hexane-rich stock, or a mixture of xylene isomers, etc. In a dehydrogenation embodiment, the charge stock can be any of the known dehydrogenatable hydrocarbons such as an aliphatic compound containing 2 to 30 carbon atoms per molecule, a $C_4$ to $C_{30}$ normal paraffin, a $C_8$ to $C_{12}$ alkylaromatic, a naphthene, and the like. In hydrocracking embodiments, the charge stock will be typically a gas oil, heavy cracked cycle oil, etc. In addition, alkylaromatic and naphthenes can be conveniently isomerized by using the catalyst of the present invention. Likewise, pure hydrocarbons or substantially pure hydrocarbons can be converted to more valuable products by using the acidic multimetallic catalyst of the present invention in any of the hydrocarbon conversion processes, known to the art, that use a dual-function catalyst.

In a reforming embodiment, it is generally preferred to utilize the novel acidic multimetallic catalytic composite in a substantially water-free environment. Essential to the achievement of this condition in the reforming zone is the control of the water level present in the charge stock and the hydrogen stream which is being charged to the zone. Best results are ordinarily obtained when the total amount of water entering the conversion zone from any source is held to a level less than 20 ppm. and preferably less than 5 ppm. expressed as weight of equivalent water in the charge stock. In general, this can be accomplished by careful control of the water present in the charge stock and in the hydrogen stream. The charge stock can be dried by using any suitable drying means known to the art, such as a conventional solid adsorbent having a high selectivity for water, for instance, sodium or calcium crystalline aluminosilicates, silica gel, activated alumina, molecular sieves, anhydrous calcium sulfate, high surface area sodium, and the like adsorbents. Similarly, the water content of the charge stock may be adjusted by suitable stripping operations in a fractionating column or like device. And in some cases, a combination of adsorbent drying and distillation drying may be used advantageously to effect almost complete removal of water from the charge stock. In an especially preferred mode of operation, the charge stock is dried to a level corresponding to less than 5 wt. ppm. of $H_2O$ equivalent. In general, it is preferred to maintain the hydrogen stream entering the hydrocarbon conversion zone at a level of about 10 wt. ppm. of water or less and most preferably about 5 wt. ppm. or less. If the water level in the hydrogen stream is too high, drying of same can be conveniently accomplished by contacting the hydrogen stream with a suitable desiccant such as those mentioned above.

In the reforming embodiment, an effluent stream is withdrawn from the reforming zone and passed through a cooling means to a separation zone, typically maintained at about 25° F. to about 150° F., wherein a hydrogen-rich gas stream is separated from a high octane liquid product stream, commonly called an unstabilized reformate. When the water level in the hydrogen stream is outside the range previously specified, at least a portion of this hydrogen-rich gas stream is withdrawn from the separating zone and passed through an adsorption zone containing an adsorbent selective for water. The resultant substantially water-free hydrogen stream can then be recycled through suitable compressing means back to the reforming zone. The liquid phase from the separating zone is typically withdrawn and commonly treated in a fractionating system in order to adjust the butane concentration thereby controlling front end volatility of the resulting reformate.

The conditions utilized in the numerous hydrocarbon conversion embodiments of the present invention are in general those customarily used in the art for the particular reaction, or combination of reactions, that is to be effected. For instance, alkylaromatic, olefin and paraffin isomerization conditions include: a temperature of about 32° F. to about 1000° F. and preferably from about 75° F. to about 600° F., a pressure of atmospheric to about 100 atmospheres; a hydrogen to hydrocarbon mole ratio of about 0.5:1 to about 20:1, and an LHSV (calculated on the basis of equivalent liquid volume of the charge stock contacted with the catalyst per hour divided by the volume of conversion zone containing catalyst) of about 0.2 hr.$^{-1}$ to about 10 hr.$^{-1}$. Dehydrogenation conditions include: a temperature of about 700° F. to about 1250° F., a pressure of about 0.1 to about 10 atmospheres, a liquid hourly space velocity of about 1 to about 40 hr.$^{-1}$, and a hydrogen to hydrocarbon mole ratio of about 1:1 to about 20:1. Likewise, typical hydrocracking conditions include: a pressure of about 500 psig. to about 3000 psig., a temperature of about 400° F. to about 900° F., an LHSV of about 0.1 hr.$^{-1}$ to about 10 hr.$^{-1}$, and hydrogen circulation rates of about 1000 to about 10,000 standard cubic feet (SCF) per barrel of charge.

In the reforming embodiment of the present invention, the pressure utilized is selected from the range of about 0 psig. to about 1000 psig., with the preferred pressure being about 50 psig. to about 600 psig. Particularly good results are obtained at a low or moderate pressure, namely, a pressure of about 100 to about 450 psig. In fact, it is a singular advantage of the present invention that it allows stable operation at lower pressures than have heretofore been successfully utilized in so-called "continuous" reforming systems (i.e. reforming for periods of about 15 to about 200 or more barrels of charge per pound of catalyst without regeneration) with all platinum monometallic catalysts. In other words, the acidic multimetallic catalyst of the present invention allows the operation of a continuous reforming system to be conducted at lower pressure (i.e. 50 to about 350 psig.) for about the same or better catalyst cycle life before regeneration as has been heretofore realized with conventional monometallic catalysts at higher pressures (i.e. 400 to 600 psig.). On the other hand, the extraordinary activity and activity-stability characteristics of the catalyst of the present invention enables reforming operations conducted at pressures of 400 to 600 psig. to achieve substantially increased catalyst cycle life before regeneration.

The temperature required for reforming with the instant catalyst is markedly lower than that required for a similar reforming operation using a high quality monometallic or bimetallic catalyst of the prior art. This significant and desirable feature of the present invention is a consequence of the extraordinary activity of the acidic multimetallic catalyst of the present invention for the octane-upgrading reactions that are preferably induced in a typical reforming operation. Hence, the present invention requires a temperature in the range of from about 800° F. to about 1100° F. and preferably about 900° F. to 1050° F. As is well known to those skilled in the continuous reforming art, the intial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that not only is the initial temperature requirement lower but also the rate at which the temperature is increased in order to maintain a constant octane product is less for the catalyst of the present invention than for an equivalent operation with a high quality reforming catalyst which is manufactured in exactly the same manner as the catalyst of the present invention except for the inclusion of the cobalt and phosphorus components. Moreover, for the catalyst of the present invention, the $C_5+$ yield loss for a given temperature increase is substantially lower than for a high quality reforming catalyst of the prior art. The extraordinary activity of the instant catalyst can be utilized in a number of highly beneficial ways to enable increased performance of a catalytic reforming process relative to that obtained in a similar operation with a monometallic or bimetallic catalyst of the prior art, some of these are: (1) Octane number of $C_5+$ product can be substantially increased without sacrificing catalyst run length. (2) The duration of the process operation (i.e. catalyst run length or cycle life) before regeneration becomes necessary can be significantly increased. (3) $C_5+$ yield can be increased by lowering average reactor pressure with no change in catalyst run length. (4) Investment costs can be lowered without sacrifice in cycle life by lowering recycle gas requirements thereby saving on capital cost for compressor capacity or by lowering initial catalyst loading requirements thereby saving on cost of catalyst and on capital cost of the reactors. (5) Throughput can be increased sharply at no sacrifice in catalyst cycle life if sufficient heater capacity is available. A most beneficial feature of the catalytic composite of the present invention is the dramatically increased selectivity realized in terms of C-5 plus yield and hydrogen production when compared with the prior art platinum-cobalt-tin catalyst system or the selectively sulfided version of the platinum-cobalt-tin catalyst system.

The reforming embodiment of the present invention also typically utilizes sufficient hydrogen to provide an amount of about 1 to about 20 moles of hydrogen per mole of hydrocarbon entering the reforming zone, with excellent results being obtained when about 2 to about 6 moles of hydrogen are used per mole of hydrocarbon. Likewise, the liquid hourly space velocity (LHSV) used in reforming is selected from the range of about 0.1 to hour 10 hr.$^{-1}$, with a value in the range of about 1 to about 5 hr.$^{-1}$ being preferred. In fact, it is a feature of the present invention that it allows operations to be conducted at higher LHSV than normally can be stably achieved in a continuous reforming process with a high quality reforming catalyst of the prior art. This last feature is of immense economic significance because it allows a continuous reforming process to operate at the same throughput level with less catalyst inventory or at greatly increased throughput level with the same catalyst inventory than that heretofore used with conventional reforming catalysts at no sacrifice in catalyst life before regeneration.

The following examples are given to illustrate further the preparation of the acidic multimetallic catalytic composite of the present invention and the use thereof in the conversion of hydrocarbons. It is understood that the examples are intended to be illustrative rather than restrictive.

EXAMPLE I

A tin-containing alumina carrier material comprising 1/16 inch spheres was prepared by: forming an aluminum hydroxyl chloride sol by dissolving substantially pure aluminum pellets in a hydrochloric acid solution, adding stannic chloride to the resulting sol in an amount selected to result in a finished catalyst containing about 0.2 wt. % tin, adding hexamethylenetetramine to the resulting tin-containing alumina sol, gelling the resulting solution by dropping it into an oil bath to form spherical particles of an aluminum-and-tin containing hydrogel, aging and washing the resulting particles and finally drying and calcining the aged and washed particles to form spherical particles of gamma-alumina containing a uniform dispersion of about 0.2 wt. % tin in the form of tin oxide and about 0.3 wt. % combined chloride. Additional details as to this method of preparing the preferred gamma-alumina carrier material are given in the teachings of U.S. Pat. No. 2,620,314.

An aqueous impregnation solution containing chloroplatinic acid, cobaltous chloride and hydrogen chloride was then prepared. The tin-containing alumina carrier material was thereafter admixed with the impregnation solution. The amount of reagents contained in this impregnation solution was calculated to result in a final composite containing, on an elemental basis, about 0.30 wt. % platinum and about 1.0 wt. % cobalt. In order to insure uniform dispersion of the metallic components throughout the carrier material, the amount of hydrochloric acid used was about 3 wt. % of the alumina particles. This impregnation step was performed by adding the carrier material particles to the impregnation mixture with constant agitation. In addition, the volume of the solution was approximately the same as the void volume of the carrier material particles. The impregnation mixture was maintained in contact with the carrier material particles for a period of about ½ to about 3 hours at a temperature of about 70° F. Thereafter, the temperature of the impregnation mixture was raised to about 225° F. and the excess solution was evaporated in a period of about 1 hour. The resulting dried impregnated particles were then subjected to an oxidation treatment in a dry air stream at a temperature of about 975° F. and a GHSV of about 500 hr.$^{-1}$ for about ½ hour. This oxidation step was designed to convert substantially all of the metallic ingredients to the corresponding oxide forms. The resulting oxidized spheres were subsequently contacted in a halogen treating step with an air stream containing H$_2$O and HCl in a mole ratio of about 30:1 for about 2 hours at 975° F. and a GHSV of about 500 hr.$^{-1}$ in order to adjust the halogen content of the catalyst particles to a value of about 1.00 wt. %. The halogen-treated spheres were thereafter subjected to a second oxidation step with a dry air stream at 975° F. and a GHSV of 500 hr.$^{-1}$ for an additional period of about ½ hour.

The oxidized and halogen treated catalyst particles were then subjected to a dry pre-reduction treatment, designed to reduce substantially all of the platinum and cobalt components to the elemental state, while maintaining the tin component in positive oxidation state, by contacting them for about 1 hour with a substantially dry hydrogen stream containing less than 5 vol. ppm. H$_2$O at a temperature of about 1050° F., a pressure slightly above atmospheric, and a flow rate of the hydrogen stream through the catalyst particles corresponding to a gas hourly space velocity of about 400 hr.$^{-1}$.

A sample of the resulting reduced catalyst particles was analyzed and found to contain, on an elemental basis, 0.34 wt. % platinum, 0.92 wt. % cobalt, 0.2 wt. % tin and 0.95 wt. % chloride. This corresponds to an atomic ratio of tin to platinum of 1:1 and to an atomic ratio of cobalt to platinum of 9:1. The resulting acidic multimetallic catalyst is hereinafter referred to as catalyst "A". This catalyst represents the prior art platinum, cobalt and tin formulation as disclosed in U.S. Pat. No. 4,046,672.

EXAMPLE II

In accordance with the teachings of the present invention a portion of the reduced catalyst prepared in EXAMPLE I was contacted with an impregnation solution comprising hypophosphorous acid and water. The concentration of the hypophosphorous acid in this impregnation solution was calculated to result in a final composite containing about 0.20 wt. % phosphorus, on an elemental basis. This impregnation step was performed by adding the composite particles to the impregnation mixture in the presence of a nitrogen environment. The impregnation mixture was maintained in contact with the composite particles for a period of about one hour at a temperature of about 70° F. Thereafter, the temperature of the impregnation mixture was raised to about 250° F. and the excess solution was evaporated in a period of about one hour. The resulting dried catalytic particles were then subjected to a final reduction step in a substantially dry and pure hydrogen stream at a temperature of about 975° F. for about one hour.

A sample of the resulting reduced catalytic particles was analyzed and found to contain, on an elemental basis, 0.34 wt. % platinum, 0.92 wt. % cobalt, 0.20 wt.

% tin, 0.20 wt. % phosphorus and 0.93 wt. % chloride. This resulting phosphorus containing catalyst is hereinafter referred to as catalyst "B".

EXAMPLE III

In order to compare the performance of the novel multimetallic catalytic composite of the present invention with the prior art sulfided platinum-tin-cobalt catalyst system, a portion of the reduced catalyst prepared in EXAMPLE I was placed into a glass bottle under a nitrogen blanket and the bottle was sealed with a rubber serum stopper. The bottle was then placed on a mechanical rotating apparatus. Hydrogen sulfide gas was then injected, using a syringe, into the bottle containing the catalyst in an amount sufficient to result in the final catalytic composite containing about 0.07 wt. % sulfur. This sulfiding procedure was performed at a temperature of about 70° F. and atmospheric pressure, while the bottle was rotating in order to ensure uniform adsorption of the hydrogen sulfide gas. The catalyst was then removed from the bottle under a nitrogen blanket and was ready for testing.

A sample of the resulting catalyst was analyzed and found to contain, on an elemental basis, 0.34 wt. % platinum, 0.92 wt. % cobalt, 0.20 wt. % tin, 0.95 wt. % chloride and 0.07 wt. % sulfur. This sulfided catalyst is hereinafter referred to as catalyst "C", and reflects the prior art sulfided platinum-tin-cobalt catalyst system as disclosed in U.S. Pat. No. 4,032,475.

EXAMPLE IV

The catalysts prepared in EXAMPLES I, II and III above were then subjected to a high stress accelerated catalytic reforming evaluation test designed to determine in a relatively short time their relative activity, selectivity, and stability characteristics in a process for reforming a relatively low-octane gasoline fraction. In all three tests the same charge stock was utilized and its pertinent characteristics are set forth in Table I. It is to be noted that in all cases the test was conducted under substantially water-free conditions with the only significant source of water being the 2 to 10 wt. ppm. present in the charge stock. Likewise, it is to be observed that both runs were performed under substantially sulfur-free conditions with the only sulfur input into the plant being the 0.1 ppm. sulfur contained in the charge stock.

TABLE I

| Analysis of Charge Stock | |
|---|---|
| Gravity, °API at 60° F. | 58.7 |
| Distillation Profile, °F. | |
| Initial Boiling Point | 200 |
| 5% Boiling Point | 216 |
| 10% Boiling Point | 222 |
| 30% Boiling Point | 246 |
| 50% Boiling Point | 266 |
| 70% Boiling Point | 298 |
| 90% Boiling Point | 330 |
| 95% Boiling Point | 344 |
| End Boiling Point | 364 |
| Chloride, wt. ppm. | 0.14 |
| Nitrogen, wt. ppm. | <.1 |
| Sulfur, wt. ppm. | 0.1 |
| Water, wt. ppm. | 2-10 |
| Octane Number, F-1 Clear | 30.4 |
| Paraffins, vol. % | 69.0 |
| Naphthenes, vol. % | 22.0 |
| Aromatics, vol. % | 9.0 |

This accelerated reforming test was specifically designed to determine in a very short period of time whether the catalyst being evaluated has superior characteristics for use in a high severity reforming operation. Each run consisted of a series of evaluation periods of 24 hours, each of these periods comprised a 12 hour line-out period followed by a 12 hour test period during which the $C_5+$ product reformate from the plant was collected and analyzed. All three test runs were performed at identical conditions which comprised a liquid hourly space velocity (LHSV) of 2.0 hr.$^{-1}$, a pressure of 300 psig., 3:1 recycle gas to oil ratio, and an inlet reactor temperature which was continuously adjusted throughout the test in order to achieve and maintain a $C_5+$ target octane of 100 F-1 clear.

All three tests were performed in a pilot plant scale reforming unit comprising a reactor containing a fixed bed of the catalyst undergoing evaluation, a hydrogen separation zone, a debutanizer column and suitable heating means, pumping means, condensing means, compressing means and the like conventional equipment. The flow scheme utilized in this plant involves commingling a hydrogen recycle stream with the charge stock and heating the resulting mixture to the desired conversion temperature. The heated mixture is then passed downflow into a reactor containing the catalyst undergoing evaluation as a stationary bed. An effluent stream is then withdrawn from the bottom of the reactor, cooled to about 55° F. and passed to a gas-liquid separation zone wherein a hydrogen-rich gaseous phase separates from a liquid hydrocarbon phase. A portion of the gaseous phase is then continuously passed through a high surface area sodium scrubber and the resulting substantially water-free and sulfur-free hydrogen-containing gas stream is returned to the reactor in order to supply the hydrogen recycle stream. The excess gaseous phase from the separation zone is recovered as the hydrogen-containing product stream (commonly called "excess recycle gas"). The liquid phase from the separation zone is withdrawn therefrom and passed to a debutanizer column wherein light ends (i.e. $C_1$ to $C_4$) are taken overhead as debutanizer gas and a $C_5+$ reformate stream recovered as the principal bottom product.

The results of the separate tests performed on catalyst "A", catalyst "C" and the particularly preferred catalyst "B" of the present invention are presented in FIGS. 1, 2 and 3 as a function of time on stream as measured in days on oil. FIG. 1 shows the relationship between $C_5+$ yield, expressed as liquid volume percent (LV%) of the charge for each of the tested catalysts. FIG. 2 depicts the observed hydrogen purity for each of the catalysts as measured in mole % of the recycle gas stream. FIG. 3 plots the inlet reactor temperature necessary for each catalyst to achieve and maintain a target research octane number of 100 for the reformate product stream.

Referring now to the results of the comparison tests presented in FIGS. 1, 2 and 3, it is evident that catalyst B has a superior selectivity relative to prior art catalysts A and C, as demonstrated in FIGS. 1 and 2 with respect to $C_5+$ yields, and hydrogen purity in the recycle gas stream. Referring now to FIG. 3, it can be seen that catalyst A is much more active than either catalyst B or C. This is evidenced by the much lower reactor temperature required by catalyst A to achieve the target octane. However, activity is only one measure of catalyst performance, and as seen by FIGS. 1 and 2, catalyst A exhibits inferior selectivity characteristics with respect to $C_5+$ yield and hydrogen purity, particularly with respect to catalyst B. In the reforming art it is not unusual for a highly active catalyst, such as catalyst A, to simultaneously perform poorly with respect to selectivity. This is primarily due to the excessive cracking of charge stock molecules to undesirable light ends such as methane, ethane, etc. This excessive cracking naturally results in lower liquid product yield and lower hydrogen purity in the excess recycle gas. As is customary in the catalytic reforming art, an attempt to attenuate somewhat this highly active catalyst was made by the addition of a sulfur component. This sulfided version of catalyst A is represented by the results of catalyst C. As can be seen in FIGS. 1, 2 and 3, the principal effect of this addition of sulfur was to reduce the activity of catalyst A while improving the initial selectivity of the catalyst. However, catalyst C was also much less stable than catalyst A as can be seen by the greater temperature increases required in order to maintain the target octane. Accompanying the lower activity-stability was a corresponding loss in selectivity-stability as evidenced by the greater rate of decline in the $C_5+$ LV% yield and hydrogen purity in the excess recycle gas for catalyst C. Therefore, although the addition of sulfur to catalyst A enhanced the selectivity while sacrificing activity, the stability at the catalyst system was also greatly reduced, thereby resulting in an overall poorer performance. Turning now to the results of catalyst B, it can be seen that the addition of a phosphorus component to catalyst A has greatly enhanced the selectivity characteristics of the catalyst while exhibiting excellent activity-stability and selectivity-stability characteristics. Specifically, although the activity of catalyst B is less than that of catalyst A as evidenced by the higher reactor temperature required in order to maintain target octane, the activity-stability of catalyst B is comparable to catalyst A in that the incremental increase in reactor temperature required to maintain target octane is substantially the same for both catalysts. This result is depicted in FIG. 3. This reduction in activity is much more than compensated for in terms of performance by the dramatic increase in selectivity exhibited by catalyst B. This increased selectivity can be seen in the increased $C_5+$ yield and hydrogen purity produced by catalyst B in FIGS. 1 and 2. Specifically, in FIG. 1 it can be seen that catalyst B produced an average of about 2.5 LV% more $C_5+$ product than catalyst A over the life of the test. Also, as seen in FIG. 2, the hydrogen purity of the excess recycle stream for catalyst B was substantially greater than catalyst A. Further, it is to be noted that catalyst B exhibited excellent selectivity-stability relative to catalyst C demonstrating phosphorus to be a much more efficient attenuator for this catalyst system than the prior art sulfur component.

In summary, it is clear from the data presented in FIGS. 1, 2 and 3 that although the dramatic increase in selectivity exhibited by catalyst B was accompanied by a 40° F. activity loss, one of ordinary skill in the art will no doubt recognize that this is but a small price to pay for these dramatic selectivity benefits.

EXAMPLE V

In order to compare the acidic multimetallic catalytic composite of the present invention with a platinum-tin bimetallic catalytic composite of the prior art in a manner calculated to bring out the beneficial interaction of the cobalt and phosphorus components on a platinum and tin containing acidic catalyst, a bimetallic catalytic composite was prepared containing a combination of a platinum component, a tin component and a chloride component with a gamma-alumina carrier material. This bimetallic catalyst is hereinafter referred to as catalyst "D". Catalyst D was prepared by a method identical to that set forth in EXAMPLE I except that the cobalt component was excluded. A sample of the reduced catalyst particles was analyzed and found to contain, on an elemental basis, 0.38 wt. % platinum, 0.29 wt. % tin and 1.08 wt. % chloride.

Catalyst D was then subjected to a high stress accelerated catalytic reforming test in the same manner and under the identical conditions set forth in EXAMPLE IV utilizing the same charge stock set forth in Table I.

The results from the testing of catalyst D are compared with the test results (from EXAMPLE IV) for the particularly preferred catalyst B of the present invention in FIGS. 4, 5 and 6 as a function of time on stream as measured in days on oil. FIG. 4 shows the relationship between $C_5+$ yield, expressed as liquid volume percent (LV%) of the charge for catalysts B and D. FIG. 5 depicts the observed hydrogen purity for each of the catalysts as measured in mole % of the recycle gas stream. FIG. 6 plots the inlet reactor temperature necessary for each catalyst to achieve and maintain a target research octane number of 100 for the reformate product stream.

Referring now to the results of the comparison test presented in FIGS. 4, 5 and 6, it is evident that the principal effect of the conjoint use of cobalt and phosphorus on a platinum-tin catalyst is to substantially promote same and to enable catalyst B to substantially out-perform catalyst D in the areas of selectivity, activity, selectivity-stability and activity-stability. That is, the data presented in these figures clearly indicates that the acidic multimetallic catalyst B of the present invention performed markedly better in a high severity reforming operation than the prior art bimetallic catalyst D. Selectivity is measured directly by the $C_5+$ LV% yield and the hydrogen purity of the excess recycle gas, and the data presented in FIGS. 4 and 5, clearly indicates catalyst B consistently produced yields and hydrogen purities which were substantially better than those of catalyst D. FIG. 4 indicates that catalyst B yielded better than about two liquid volume percent more $C_5+$ product on an average over the life of the test then did catalyst D. FIG. 5 represents a selectivity advantage for catalyst B over catalyst D of better than about four mole percent hydrogen in the excess recycle gas on the average over the life of the test. Also, catalyst B demonstrates better selectivity-stability characteristics as evidenced by the smaller rate of change in the $C_5+$ yield and hydrogen purity over the life of the run in response to reactor temperature increases required in order to maintain the target octane of the $C_5+$ product. Referring now to FIG. 6 it can be seen that catalyst B is more active than catalyst D as indicated by the lower temperature required in order to achieve target octane. As can be seen in FIG. 6, catalyst B required an average of about ten degrees less over the life of the run than catalyst D in order to achieve target octane. Also, it can be observed from FIG. 6, that catalyst B is more stable than catalyst D in that it required less of a reactor temperature increase, particularly beyond the seventh test period, in order to maintain target octane.

In summary, it is clear from the data presented in FIGS. 4, 5 and 6 that a combination of a cobalt component and a phosphorus component provides an efficient and effective promoter and stabilizer for a platinum-tin containing acidic reforming catalyst in a high severity reforming operation.

It is intended to cover by the following claims, all changes and modifications of the above disclosure of the present invention which would be self-evident to a man of ordinary skill in the hydrocarbon conversion art or the catalyst formulation art.

We claim as our invention:

1. An acidic catalytic composite comprising a porous carrier material containing at least five catalytic components comprising, on an elemental basis, from about 0.01 to about 2 wt% platinum, from about 0.5 to about 5 wt% cobalt, from about 0.01 to about 5 wt% tin, from about 0.01 to about 5 wt% phosphorous and from about 0.1 to about 3.5 wt% of a halogen component.

2. The acidic catalytic composite of claim 1 wherein the atomic ratio of tin to platinum group metal contained in the composite is about 0.1:1 to about 13:1 and wherein the atomic ratio of cobalt to platinum group metal contained in the composite is about 0.15:1 to about 66:1.

3. The acidic catalytic composite of claim 1 wherein said phosphorus is added by the addition of a hypophosphorous acid.

4. The acidic catalytic composite of claim 1 wherein said phosphorus is added by the addition of a dimethylphosphite.

5. The acidic catalytic composite of claim 1 wherein said phosphorus is added by the addition of a triphenylphosphine.

6. The acidic catalytic composite of claim 1 wherein said phosphorus is added by the addition of a cyclohexylphosphine.

7. The acidic catalytic composite of claim 1 wherein said phosphorus is added by the addition of a phosphorous trichloride.

8. The acidic catalytic composite of claim 1 wherein said phosphorus is added by the addition of a phosphoric acid.

9. The acidic catalytic composite of claim 1 wherein said phosphorus is added by the addition of a trisbutyl phosphite.

10. The acidic catalytic composite of claim 1 wherein said phosphorus is added by the addition of a phosphorous tribromide.

11. The acidic catalytic composite of claim 1 wherein said phosphorus is added by the addition of a phosphorous triiodide.

12. The acidic catalytic composite of claim 1 wherein said phosphorus is added by the addition of a phosphorous oxychloride.

13. The composite of claim 1 wherein the platinum group metal is platinum.

14. The composite of claim 1 wherein the porous carrier material is a refractory inorganic oxide.

15. The composite of claim 1 wherein the porous carrier material is alumina.

16. The composite of claim 1 wherein the halogen component is a chlorine component.

17. The acidic catalytic composition of claim 1 wherein said phosphorus is added by the addition of tributylphosphine oxide.

* * * * *